(12) United States Patent
Hartmann et al.

(10) Patent No.: US 10,947,056 B2
(45) Date of Patent: Mar. 16, 2021

(54) ADAPTIVE ROLLER CONVEYOR

(71) Applicant: Deutsche Post AG, Bonn (DE)

(72) Inventors: Bernd Hartmann, Grafschaft-Leimersdorf (DE); Oliver Prinz, Bad Krozingen (DE); Stephan Kolb, Freiburg im Breisgau (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/568,872

(22) Filed: Sep. 12, 2019

(65) Prior Publication Data
US 2020/0087077 A1    Mar. 19, 2020

(30) Foreign Application Priority Data
Sep. 17, 2018  (DE) .................... 10 2018 215 773.1

(51) Int. Cl.
*B65G 43/08* (2006.01)
*B65G 13/075* (2006.01)

(52) U.S. Cl.
CPC .......... *B65G 43/08* (2013.01); *B65G 13/075* (2013.01); *B65G 2203/025* (2013.01); *B65G 2203/0258* (2013.01); *B65G 2203/043* (2013.01); *B65G 2203/044* (2013.01)

(58) Field of Classification Search
None
See application file for complete search history.

(56) References Cited

U.S. PATENT DOCUMENTS

| | | | | |
|---|---|---|---|---|
| 3,713,521 A * | 1/1973 | Moritake | ............. | B65G 13/075 193/37 |
| 3,918,561 A * | 11/1975 | Isacsson | ............. | B65G 13/075 193/35 A |
| 5,865,291 A * | 2/1999 | Affeldt | ................... | B65G 47/24 198/460.1 |
| 6,244,424 B1 | 6/2001 | Reusser et al. | | |
| 6,467,601 B2 * | 10/2002 | Schmale | ............. | B65G 13/075 193/35 A |
| 6,640,953 B2 * | 11/2003 | Brouwer | ................. | B65G 1/08 193/35 A |
| 7,021,456 B2 * | 4/2006 | Haan | .................... | B65G 13/075 193/35 A |
| 9,415,937 B2 * | 8/2016 | Kupper | ................ | B65G 13/075 |
| 9,908,717 B2 * | 3/2018 | Stefanko | ............... | B65G 17/40 |
| 9,987,755 B2 * | 6/2018 | Prahlad | ................ | B25J 15/0085 |
| 10,173,842 B2 * | 1/2019 | Dudek | .................. | B65G 39/09 |

(Continued)

FOREIGN PATENT DOCUMENTS

| | | |
|---|---|---|
| DE | 202012102405 U1 | 9/2013 |
| EP | 0947448 A1 | 10/1999 |
| JP | 05043025 A * | 2/1993 |

(Continued)

*Primary Examiner* — William R Harp
(74) *Attorney, Agent, or Firm* — The Webb Law Firm

(57) ABSTRACT

An adaptive roller conveyor for conveying objects, comprises a plurality of rollers and a control device, wherein the control device is connected with a sensor for detecting at least one parameter of an object, wherein at least one roller is connected with an adjustable brake device, wherein the brake device is connected with the control device, and wherein the control device is configured to control the brake device in dependence on the detected parameter to change the braking effect of the roller.

23 Claims, 3 Drawing Sheets

(56) References Cited

U.S. PATENT DOCUMENTS

2004/0173440 A1    9/2004    Mauch et al.

FOREIGN PATENT DOCUMENTS

| JP | H543025 A | | 2/1993 |
|---|---|---|---|
| NL | 1021991 C2 | * | 5/2004 |
| NL | 1021991 C2 | | 5/2004 |
| SU | 1745629 A1 | | 7/1992 |

* cited by examiner

ADAPTIVE ROLLER CONVEYOR

CROSS-REFERENCE TO RELATED APPLICATION

This application claims priority to German Patent Application No. 10 2018 215 773.1 filed Sep. 17, 2018, the disclosure of which is hereby incorporated by reference in its entirety.

BACKGROUND OF THE INVENTION

The invention relates to an adaptive roller conveyor, in particular for sorters, for conveying objects such as e.g. packages, piece goods, parcels, packets, mailings, bags and other packaged goods. The present invention relates to a sorter comprising such an adaptive roller conveyor. Moreover, the invention relates to a method for using the adaptive roller conveyor.

In package distribution centers the packages arriving are sorted in various sorters and discharged sorted by destination. The packages discharged by the sorter at a defined position generally slide down a chute or a roller conveyor to be loaded directly into a vehicle such as e.g. delivery vehicles or a swap body for further transportation. It is intended that the packages arrive at the end of the chute without damage and also not damage other packages lying at the end of the chute due to their velocity. Here, the packages slide down the chutes in an uncontrolled manner. The velocity is adjusted through different frictions. Variations are made between chutes and roller conveyors, wherein, with chutes, it is further possible to adjust the material (metal/wood) and the inclination. These parameters have to be selected once for the packages to be expected on average. Thus, smooth/heavy packages will be moving significantly faster than rough/light packages. It is a disadvantage of the known inclined conveyors that these cannot be constructed to be very steep and thereby require an enormous amount of space. In addition, heavy packages may damage light packages.

It is an object of the invention, to provide an adaptive roller conveyor allowing to overcome a great height over as short a distance as possible, without the objects conveyed, such as e.g. mail items, being damaged.

SUMMARY OF THE INVENTION

According to the invention the object is achieved with an adaptive roller conveyor having the features of the present disclosure. The object is further achieved with a sorter as defined herein. Moreover, the object is achieved with a method according to the present disclosure.

The adaptive roller conveyor of the present invention for transporting objects, in particular mail items, packages, piece goods, packets, parcels, mailings, bags and other packaged goods, in particular in sorters for sorting mail items or packages, comprises a plurality of rollers, as well as a control device, wherein the control device is connected with a sensor for detecting at least one parameter of one of the objects. Here, at least one roller is connected with an adjustable brake device, wherein the brake device is connected with the control device. The control device is configured to control the brake device as a function of the detected parameter in order to change the braking effect of the roller. It is an advantage of the adaptive roller conveyor that by changing the braking effect of the roller, the sliding velocity of the object can be varied over the adaptive roller and can be adapted to the respective object or mail item as a function of the detected parameter. Thereby, it is possible on the one hand that the adaptive roller conveyor has a greater inclination than conventional roller conveyors or inclined conveyors so that the adaptive roller conveyor of the present invention can be set up in a more space-saving manner. Despite the greater inclination, it is ensured by changing the braking effect that the objects reach e.g. a collecting box or a vehicle, such as a delivery vehicle, undamaged. On the other hand, the adaptive roller conveyor of the present invention may be used for singling the conveyed mail items or objects.

Preferably, more than one roller is connected with an adjustable brake device. Here, these rollers may be connected with a common braking device so that it is merely necessary to provide one adjustable brake device. As an alternative one adjustable brake device may be provided for each single roller, respectively. Thereby, it is possible to control the braking effect of each single roller individually and to thus be able to precisely control the movement of the objects along the adaptive roller conveyor.

The brake device preferably comprises an eddy-current brake, wherein the eddy-current brake comprises a magnet and a metal element in which the eddy currents are generated by the magnet. Here, the braking effect is produced in a contactless manner in the eddy-current brake, whereby wear is reduced and the longevity of the brake device is significantly enhanced.

Preferably, the magnet is a permanent magnet, wherein the distance between the permanent magnet and the metal element is variable for changing the braking force. Thereby, in a simple manner, a brake device is provided in which the braking effect is variable.

The magnet preferably is an electromagnet, wherein the current with which the electromagnet is supplied is variable for changing the braking effect. If, for example, the current is increased, the electromagnet creates a stronger magnetic field, which will cause greater eddy currents in the metal element and thus also increase the braking effect. It is advantageous that no movable parts are required anymore and the brake device thus operates in a wear-free manner.

The brake device preferably is an adjustable mechanical brake, wherein the friction of a brake element is variable for changing the brake force. This is a particularly simple brake device which, in particular, can be realized in an economic manner.

If a brake device is provided at more than one roller, the respective brake devices may each be configured as described above. It is possible for the brake devices to be configured differently at the respective rollers. However, the configuration of the brake devices is preferably the same at the respective rollers.

Preferably, the brake device is integrated in the roller or arranged below the roller. Thus, e.g. an eddy-current brake may be integrated in the roller itself, whereby a particularly compact structure is obtained. As an alternative, the brake device may be provided in a brake roller which is in direct contact with the roller to be braked. Thereby, a simple access to the brake device is provided e.g. for maintenance or repair purposes.

The adaptive roller conveyor preferably comprises a plurality of independently rotatable rollers. It is ensured thereby that a successive braking of the mail item or the object is guaranteed along the roller conveyor so that the rollers at the beginning of the roller conveyor may rotate faster than the rollers at the end of the roller conveyor.

As an alternative, a number of rollers of the plurality of rollers are coupled with each other, so that the coupled rollers can be rotated together. In particular, the rollers are coupled by means of a belt. Specifically, if only one brake device is provided, coupling the rollers allows the braking effect to be transmitted to all coupled rollers and to achieve an effective braking of the object.

Preferably, a chute is provided. Here, the chute may be arranged downstream of the rollers in the direction of movement of the object. However, it is preferred to arrange the chute upstream of the roller in the direction of movement of the object. Of course, rollers may also be provided upstream and downstream of the chute.

The parameter detected by the sensor preferably is the velocity of the object. Here, in particular the velocity of the object on a predetermined section of the inclined path is detected by means of the sensor. The predetermined section may be a part of the roller conveyor and, in particular, it is the chute or a part of the chute. Since the velocity is measured in particular always in the predetermined section and the marginal conditions during the velocity measurement in this section are known, the movement behavior of the adjoining roller conveyor can be concluded therefrom in a simple manner. Thus, the brake device or the brake devices can be controlled in an appropriate manner based on the detected velocity.

The sensor for determining the velocity preferably comprises a light barrier. In particular, the sensor for determining the velocity comprises two light barriers, which are arranged one after the other in the movement direction of the object. The velocity is obtained from the time-delayed interruption of the light barriers, with the distance between the light barriers being predetermined. As an alternative or in addition, the sensor for determining the velocity comprises a capacitive sensor or an inductive sensor or an ultrasound sensor, wherein the presence or the absence of an object is detected by a change in capacitance or inductivity or a change of the reflected ultrasound. As an alternative or in addition, the sensor for determining the velocity comprises a high-frequency sensor, wherein in particular a high-frequency signal is emitted, wherein the presence of objects or mail items is detected based on the interference with the high-frequency signal. As an alternative or in addition, the sensor for determining the velocity comprises a Doppler radar. As an alternative or in addition, the sensor for determining the velocity comprises an optical sensor such as e.g. a camera, wherein the velocity of the objects is determined using image capturing. As an alternative or in addition, at least one roller comprises an encoder for determining the rotation speed. The velocity of the abject can be determined therefrom based on the known circumference of the roller.

The parameter detected by the sensor preferably is the weight. It is thereby ensured that light objects can pass the roller conveyor faster, whereby the throughput of object can be optimized. At the same time, heavier objects can be slowed down more, so that damage to other objects is avoided.

The sensor for detecting the weight is preferably arranged in a roller. Thus, the weight of the object can be detected immediately upon entering the roller conveyor, wherein the weight thus detected is used by the control device to control and adjust the braking effect of the brake device.

As an alternative or in addition, the sensor is arranged to detect the weight when discharging the object, wherein the control device is configured to buffer and store the weight thus detected. The control device then controls the brake device as soon as the object reaches the adaptive roller conveyor. Thereby, the detected weight of the object is stored in the control device. Due to the use of a sorter, it is known when which object falls into a respective roller conveyor so that a respective control of the brake device becomes possible.

Preferably, the parameter detected by the sensor is the outer material of the object. The outer material has an essential influence on the velocity of the object during sling and on the rollers. If e.g. the material is very rough, the object will slide very slowly. At the same time, the braking effect of the rollers is very effective. In case of a very rough outer material, for example, the braking effect of the roller can be reduced so that the throughput of the objects is increased.

The sensor for detecting the outer material preferably comprises a microwave sensor. Here, the microwave sensor comprises a microwave resonator for determining the change in resonance caused by the outer material. Depending on the material moving over the roller, the resonant frequency and the impedance at the resonant frequency change. The properties of the material can be concluded therefrom.

Preferably, the sensor is integrated in at least one roller. Thereby, a particularly compact structure is achieved.

Preferably the sensor is arranged upstream of the first brake device in the direction of movement, so that a control of the variable braking effect is possible on an object-by-object basis.

The adaptive roller conveyor preferably has more than one section, wherein each section comprises at least one brake device, so that the braking effect can be changed independently for a respective section. Thereby, it is possible to convey a plurality of mail items or objects at the same time using one adaptive roller conveyor, whereby the throughput of the objects can be increased. At the same time, a singling of the objects to be conveyed can be ensured effectively due to the provision of the sections.

Preferably, more than one parameter is determined. Thus, a complete characterization of a respective object can be made, and the brake device can be controlled based on this characterization so as to ensure a high throughput of objects on the one hand and to avoid mutual damaging of the objects on the other hand.

Preferably, a plurality of sensors is provided. A plurality of sensors may be provided in order to detect one and the same parameter so that there is redundancy. As an alternative or in addition, a plurality of sensors can be provided for determining different parameters.

At least one roller preferably comprises a plurality of sensor sections in the axial direction. Thereby, the width of the object can be detected in a simple manner for further characterization of the object. At least one roller preferably comprises a plurality of sensor sections along its circumference, so that the length of the object can e detected in the longitudinal direction. For this purpose, in particular an encoder is provided to determine the rotation speed of the roller, so that, with the diameters of the rollers known, the length of the object can be determined. In particular, the sensor sections are inductive sensors, capacitive sensors or ultrasound sensors.

Further, the present invention relates to a sorter for sorting objects, e.g. packages, comprising one or a plurality of adaptive roller conveyors as described above for conveying objects in the sorter.

The present invention further relates to a method of operating an adaptive roller conveyor comprising a plurality of rollers for conveying objects. In the method, first a parameter of the object is determined. Thereafter, the braking effect of an adjustable brake device connected with at least one roller is changed based on the parameter.

The method is preferably developed based on the features of the above described adaptive roller conveyor. In particular, the parameter determined is the weight of the object transferred and/or the velocity of the object in a predefined section of the adaptive roller conveyor and/or the outer material of the object.

Further advantages, particularities and useful developments of the invention result from the dependent claims and the following illustration of preferred embodiments with reference to the drawings.

DETAILED DESCRIPTION OF THE INVENTION

Figure 1:
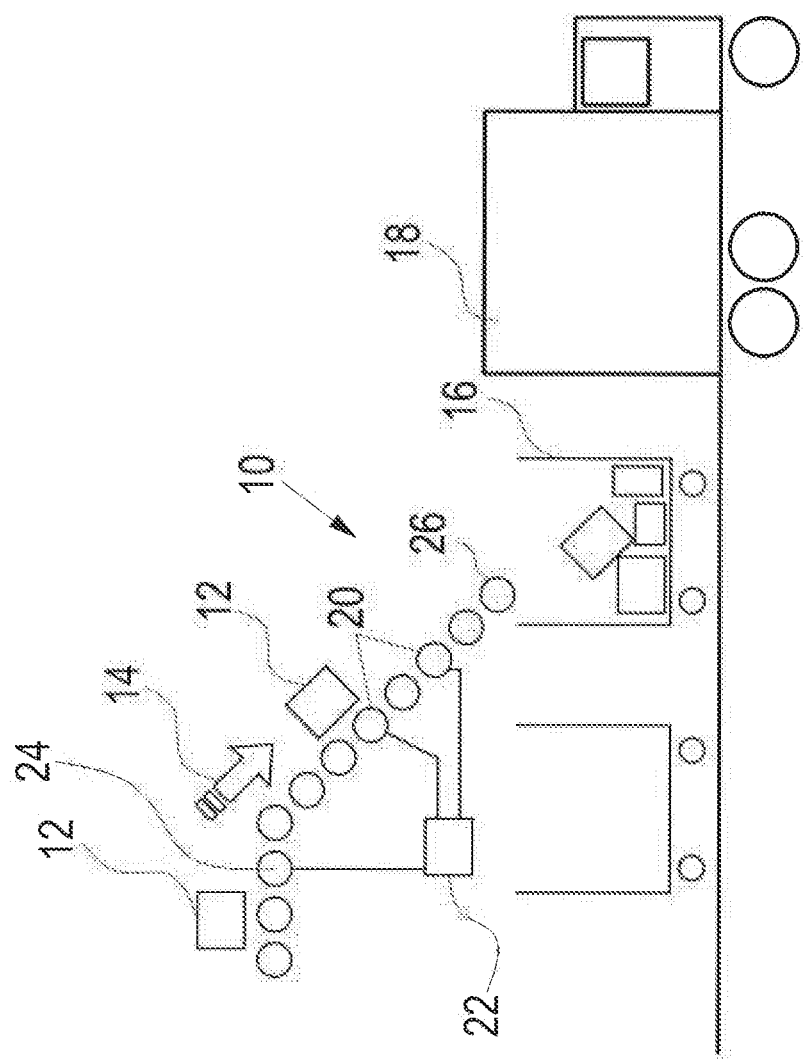
FIG. 1 is a schematic illustration of an adaptive roller conveyor according to the present invention in use.

FIG. 1 illustrates an adaptive roller conveyor 10 according to the present invention. An object 12, such as e.g. packages, piece goods, parcels, packets, mailings, bags and other packaged goods, arrives from a sorter (not illustrated) on the adaptive roller conveyor 10 and is moved towards a collecting box 16 by driven rollers or by weight force as indicated by the arrow 14. The collecting box 16 may then be loaded into a vehicle, e.g. a delivery vehicle 18, for delivery. In order to avoid that objects in the collecting box 16 are damaged by objects 12 arriving, the velocity of the objects arriving must not be too high. At the same time, excessive braking of the object 12 is not desired, since the throughput of objects to be conveyed is reduced thereby. For this purpose, brake rollers 20 are provided which are connected with an adjustable brake device. The adjustable brake device is in particular an eddy-current brake whose effect can be varied. In FIG. 1, only two brake rollers 20 are provided. However, the number of brake rollers 20 is freely selectable, so that more or fewer brake rollers 20 may be provided to ensure a suitable control of the movement of the objects 12.

The brake rollers 20 are connected with a control device 22 by which the brake device in the brake roller 20 can be controlled to adapt the braking effect. Further, a sensor roller 24 is provided, wherein the sensor roller 24 detects at least one parameter of the object 12. The parameter is e.g. the weight of the object 12, the velocity of the object 12 or the outer material of the object 12. The sensor roller 24 is connected with the control device 22, wherein the control device 22 controls the brake device in the brake roller 20 corresponding to the parameter detected by the sensor roller 24. If the velocity of an object 12 is too high, which is detected by the sensor roller 24, the control device 22 increases the braking effect of the brake rollers 20, so that a sufficient reduction of the velocity of the object 12 can be achieved along the adaptive roller conveyor 10 and the object 12 thus does not damage other objects in the collecting box 16.

Hereinafter, identical or similar components will be identified by the same reference numerals.

Figure 2A:
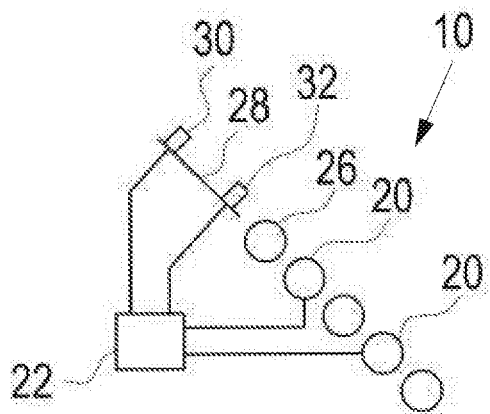
FIG. 2a is an adaptive roller conveyor according to an embodiment.

FIG. 2a shows an alternative embodiment of the adaptive roller conveyor 10, in which a chute 28 is provided upstream of the rollers 26 in the direction of movement. Further, a first light barrier 30 is provided in the area of the chute 28, and a second light barrier 32 is provided downstream of the first light barrier 30 in the direction of movement, which is also arranged in the area of the chute 28. The chute 28 forms a defined section of the adaptive roller conveyor 10, wherein the first light barrier 30 and the second light barrier 32 allow the velocity of an object 12 to be determined. Since the properties of the movement of the object 12, which is defined by the chute 28, are identical for all objects 12, i.e. identical initial velocity and identical surface, measuring the velocity by means of the first light barrier 30 and the second light barrier 32 allows to conclude on the further movement behavior of a respective object 12 on the adjoining roller conveyor. The brake rollers 20 are then controlled by the control device 22 in a suitable manner to obtain a braking effect that, on the one hand, ensures an optimal throughput and, on the other hand, avoids damage to other objects e.g. in the collecting boxy 16.

Figure 2B:
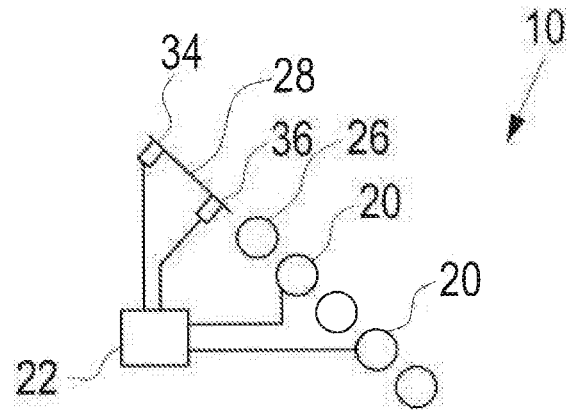
FIG. 2b is an adaptive roller conveyor according to a further embodiment of the present invention.

FIG. 2b comprises a first sensor 34 and a second sensor 36 instead of the first light barrier 30 and the second light barrier 32, wherein the first sensor 34 and the second sensor 36 can't detect the presence of an object, such as e.g. a mail item, on the chute 28. The first sensor 34 and the second sensor 36 are e.g. an inductive sensor, a capacitive sensor or an ultrasound sensor by which the presence of an object 12 can be detected in a simple manner. Thus, the first sensor 34 and the second sensor 36 detect the velocity of the object 12 in the section of the adaptive roller conveyor 10 defined by the chute 28. The brake rollers 20 are controlled correspondingly by the control device 22 to achieve an optimal movement behavior of the object 12.

As an alternative, the defined section may of course be formed in the area of the rollers 26.

Figure 2C:
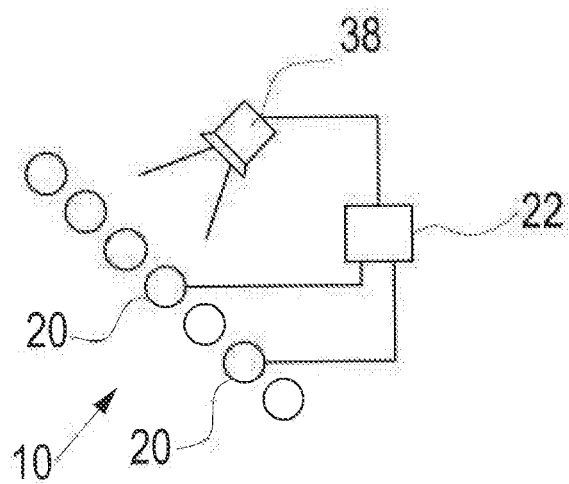
FIG. 2c is a further embodiment of the adaptive roller conveyor according to the present invention.

In FIG. 2c, a camera 38 is provided which detects the velocity of the objects in a defined section of the adaptive roller conveyor 12, using imaging. Since the properties of the movement are the same for all objects 12 in the defined section, the detected velocity of a respective object 12 allows to conclude on the further movement behavior along the adaptive roller conveyor 10. The brake rollers 20 are correspondingly controlled in a suitable manner by the control device 22 to obtain an optimum movement behavior for a respective object 12.

Figure 2D:
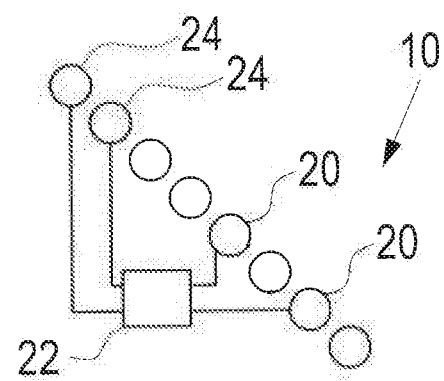
FIG. 2d is another embodiment of the adaptive roller conveyor of the present invention.
Figure 2E:
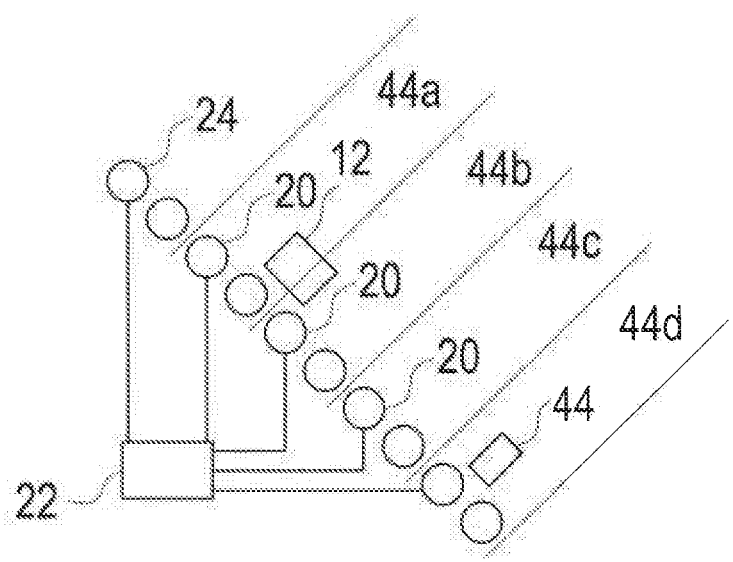
FIG. 2e is another embodiment of the adaptive roller conveyor of the present invention, and FIG. 3 a detail view of a roller.

In FIG. 2d, two sensor rollers 24 are provided. The sensor rollers 24 may e.g. be sensor rollers which detect the presence of an object by means of an emitted high frequency signal, as known from DE 10 2014 109 A1 that is incorporated herein in its entirety.

The sequence of rollers 26 and chute 28 illustrated in FIGS. 2a-2d can be adapted to the respective application as desired. For example, further rollers 26 may be provided upstream of the chute 28 in the direction of movement 14 of the object 12. Further, it is possible that individual or a plurality of rollers 26 are driven for an active advancing of the objects 12. Likewise, the arrangement of the brake rollers can be selected freely among the plurality of existing rollers 26 so it can be adapted to a respective application.

Similarly, the adaptive roller conveyor 10 may be subdivided into one or a plurality of sections 45a to 45b, wherein individual sections 45a to 45d each comprise at least one brake roller 20 which can be controlled differently by the control device 22. Thus, further objects 44 can be moved on the adaptive roller conveyor 10 at the same time.

Figure 3:
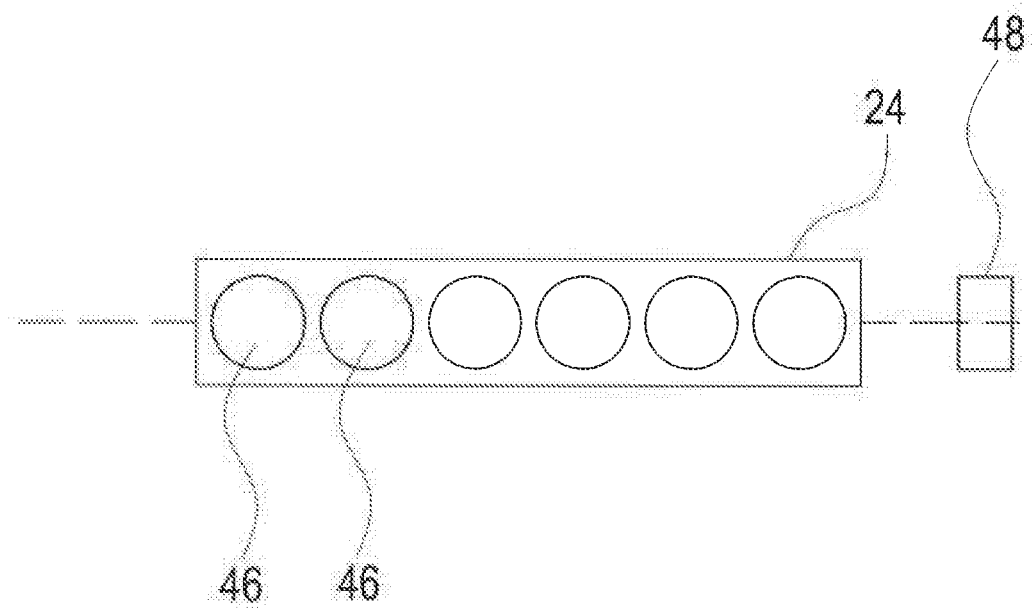

FIG. 3 is a detail view of a sensor roller 24. The sensor roller 24 has a plurality of sensor surfaces 46. By providing the sensor surfaces 46 it is possible to detect the width of the object, depending on which of the sensor surfaces 46 are covered by the object. At the same time, the sensor roller 24 is connected with an encoder 48 so that the rotation speed of the sensor roller 24 is known. From the known circumference of the sensor roller 24 it is possible on the one hand to conclude on the rolling velocity of the sensor roller 24, on the other hand, by providing the sensor surfaces 46, it is possible to thereby conclude on the length of the object, so that by providing the sensor surfaces 46 the width and the length of the object can be determined.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope. Further, the features of the individual embodiments may be combined freely, so that the arrangement of rollers 20 and chute 28, as well as the arrangement of the sensors can be combined freely with each other.

The invention claimed is:

1. An adaptive roller conveyor for conveying objects, comprising:
   a plurality of rollers; and
   a control device,
   wherein the control device is connected with at least one sensor for detecting at least one parameter of an object,
   wherein the at least one parameter comprises a weight of the object,
   wherein at least one roller of the plurality of rollers is connected with an adjustable brake device, wherein the adjustable brake device is connected with the control device, and wherein the control device is configured to control the adjustable brake device in dependence on the detected at least one parameter to change a braking effect of the roller, and
   wherein the at least one sensor for detecting the weight is arranged immediately at an inlet of the adaptive roller conveyor.

2. The adaptive roller conveyor of claim 1, wherein the adjustable brake device comprises an eddy-current brake, wherein the eddy-current brake comprises a magnet and a metal element in which the eddy currents are generated.

3. The adaptive roller conveyor of claim 2, wherein the magnet is an electromagnet and the eddy current is variable to change the braking force.

4. The adaptive roller conveyor of claim 1, wherein the adjustable brake device is an adjustable mechanical brake, wherein the friction of a brake element is variable to change the braking force.

5. The adaptive roller conveyor of claim 1, wherein the adjustable brake device is integrated in the at least one roller or is arranged below the at least one roller.

6. The adaptive roller conveyor of claim 1, wherein the plurality of rollers are rotatable independent of each other.

7. The adaptive roller conveyor of claim 1, wherein a number of rollers of the plurality of rollers are coupled with each other, so that the coupled rollers can be rotated together.

8. The adaptive roller conveyor of claim 1, further comprising a chute, wherein the chute is arranged upstream of the plurality of rollers in a direction of movement of the object.

9. An adaptive roller conveyor for conveying objects, comprising:
   a plurality of rollers; and
   a control device,
   wherein the control device is connected with at least one sensor for detecting at least one parameter of an object
   wherein the at least one parameter comprises a weight of the object,
   wherein at least one roller of the plurality of rollers is connected with an adjustable brake device, wherein the adjustable brake device is connected with the control device, and wherein the control device is configured to control the adjustable brake device in dependence on the detected at least one parameter to change a braking effect of the roller, and
   wherein the at least one sensor for detecting the weight is arranged in a roller.

10. The adaptive roller conveyor of claim 9, wherein the adjustable brake device comprises an eddy-current brake, wherein the eddy-current brake comprises a magnet and a metal element in which the eddy currents are generated, and wherein the magnet is an electromagnet and the eddy current is variable to change the braking force.

11. The adaptive roller conveyor of claim 9, wherein the adjustable brake device is an adjustable mechanical brake, wherein the friction of a brake element is variable to change the braking force.

12. The adaptive roller conveyor of claim 9, wherein the adjustable brake device is integrated in the at least one roller or is arranged below the at least one roller.

13. The adaptive roller conveyor of claim 9, wherein the plurality of rollers are rotatable independent of each other.

14. The adaptive roller conveyor of claim 9, wherein a number of rollers of the plurality of rollers are coupled with each other, so that the coupled rollers can be rotated together.

15. The adaptive roller conveyor of claim 9, further comprising a chute, wherein the chute is arranged upstream of the plurality of rollers in a direction of movement of the object.

16. The adaptive roller conveyor of claim 9, wherein the at least one roller comprises a plurality of sensor sections in at least one of an axial direction and along the at least one roller's circumference, for a detection of the width and the length of the object.

17. An adaptive roller conveyor for conveying objects, comprising:
   a plurality of rollers; and
   a control device,
   wherein the control device is connected with at least one sensor for detecting at least one parameter of an object
   wherein the at least one parameter comprises a weight of the object,
   wherein at least one roller of the plurality of rollers is connected with an adjustable brake device, wherein the adjustable brake device is connected with the control device, and wherein the control device is configured to control the adjustable brake device in dependence on the detected at least one parameter to change a braking effect of the roller, and wherein the at least one sensor is arranged to detect the weight upon discharge of the object, wherein the control device is configured to store the weight, and wherein the control device controls the adjustable brake device when the object reaches the adaptive roller conveyor.

18. The adaptive roller conveyor of claim 17, wherein the adjustable brake device comprises an eddy-current brake, wherein the eddy-current brake comprises a magnet and a metal element in which the eddy currents are generated, and wherein the magnet is an electromagnet and the eddy current is variable to change the braking force.

19. The adaptive roller conveyor of claim 17, wherein the adjustable brake device is an adjustable mechanical brake, wherein the friction of a brake element is variable to change the braking force.

20. The adaptive roller conveyor of claim 17, wherein the adjustable brake device is integrated in the at least one roller or is arranged below the at least one roller.

21. The adaptive roller conveyor of claim 17, wherein the plurality of rollers are rotatable independent of each other.

22. The adaptive roller conveyor of claim 17, wherein a number of rollers of the plurality of rollers are coupled with each other, so that the coupled rollers can be rotated together.

23. The adaptive roller conveyor of claim 17, further comprising a chute, wherein the chute is arranged upstream of the plurality of rollers in a direction of movement of the object.

\* \* \* \* \*